United States Patent
Wachi

(10) Patent No.: US 12,407,254 B2
(45) Date of Patent: Sep. 2, 2025

(54) POWER SUPPLY SEMICONDUCTOR DEVICE AND DC/DC CONVERTER

(71) Applicant: Rohm Co., Ltd., Kyoto (JP)

(72) Inventor: Takatsugu Wachi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 229 days.

(21) Appl. No.: 18/364,046

(22) Filed: Aug. 2, 2023

(65) Prior Publication Data
US 2024/0079959 A1   Mar. 7, 2024

(30) Foreign Application Priority Data

Sep. 7, 2022   (JP) .................................. 2022-141937

(51) Int. Cl.
*H02M 3/158*   (2006.01)
*H02M 1/08*    (2006.01)
*H02M 1/44*    (2007.01)

(52) U.S. Cl.
CPC ............. *H02M 3/158* (2013.01); *H02M 1/08* (2013.01); *H02M 1/44* (2013.01)

(58) Field of Classification Search
CPC ........... H02M 3/158; H02M 1/08; H02M 1/44
See application file for complete search history.

(56) References Cited

U.S. PATENT DOCUMENTS

| | | | |
|---|---|---|---|
| 6,556,083 B2 * | 4/2003 | Kadanka | H03F 1/086 330/109 |
| 7,173,402 B2 * | 2/2007 | Chen | G05F 1/575 323/280 |
| 10,133,287 B2 * | 11/2018 | Yang | G05F 1/575 |
| 2018/0198322 A1 * | 7/2018 | Mercier | H02J 50/70 |

FOREIGN PATENT DOCUMENTS

JP   2018-118504   8/2018

* cited by examiner

*Primary Examiner* — Rafael O De Leon Domenech
(74) *Attorney, Agent, or Firm* — Fish & Richardson P.C.

(57) ABSTRACT

A power supply semiconductor device includes: first and second external terminals connected to positive and negative electrodes of input capacitor via first and second external current paths, respectively; third and fourth external terminals connected to the positive and negative electrodes of the input capacitor via third and fourth external current paths, respectively; first and second transistors provided between the first and second external terminals; third and fourth transistors provided between the third external terminal and the fourth external terminal; switch terminal commonly connected to connection node between the first and second transistors and connection node between the third and fourth transistors; and drive control circuit performing switching control to alternately turn on and off a set of the first and third transistors and a set of the second and fourth transistors, thereby generating a switching voltage at the switch terminal based on voltage across the input capacitor.

9 Claims, 7 Drawing Sheets

POWER SUPPLY SEMICONDUCTOR DEVICE AND DC/DC CONVERTER

CROSS-REFERENCE TO RELATED APPLICATION

This application is based upon and claims the benefit of priority from Japanese Patent Application No. 2022-141937, filed on Sep. 7, 2022, the entire contents of which are incorporated herein by reference.

TECHNICAL FIELD

The present disclosure relates to a power supply semiconductor device and a DC/DC converter.

BACKGROUND

There is known a DC/DC converter which includes a half-bridge circuit including a high-side transistor and a low-side transistor, is configured to switch an input voltage applied to the half-bridge circuit by turning on and off these transistors alternately, and obtains an output voltage by rectifying and smoothing a switching voltage.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
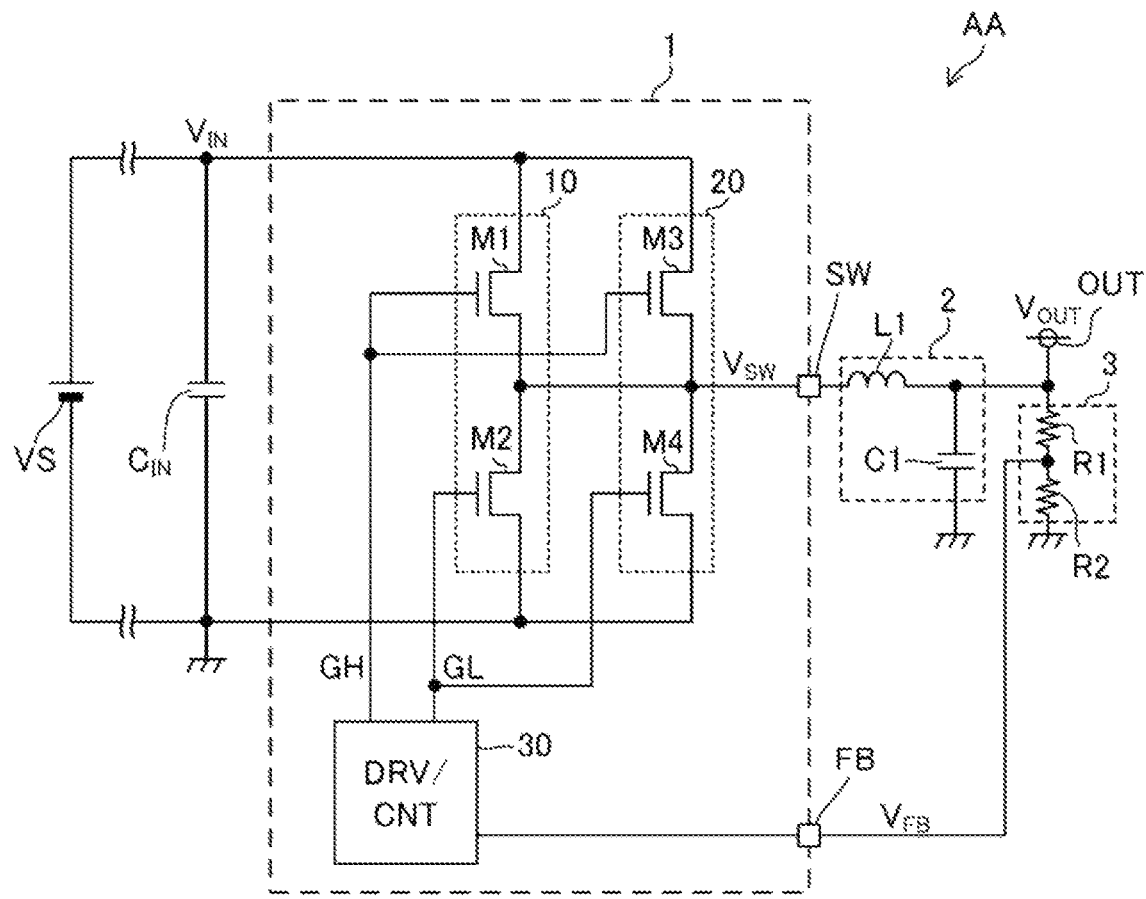
FIG. 1 is an overall configuration diagram of a power supply device according to an embodiment of the present disclosure.

Hereinafter, examples of embodiments of the present disclosure will be specifically described with reference to the drawings. In each figure referred to, the same parts are denoted by like reference numerals, and redundant descriptions of the same parts are omitted in principle. In the present disclosure, for the sake of simple description, by describing symbols or codes that refer to information, signals, physical quantities, functional parts, circuits, elements, components, or the like, names of the information, signals, physical quantities, functional parts, circuits, elements, components, or the like, which correspond to the pertinent symbols or codes, may be omitted or abbreviated.

First, a description will be made for some terms used in describing the embodiment of the present disclosure. The term "ground" refers to a reference conductive portion with a potential of 0 V (zero volts) as a reference, or refers to a potential of 0 V itself. The reference conductive portion may be formed by using a conductor such as metal. The potential of 0 V is sometimes referred to as a ground potential. In the embodiments of the present disclosure, voltages shown without a specific reference represent potentials with respect to the ground.

The term "level" refers to a level of potential. For any given signal or voltage of interest, a high level has a higher potential than a low level. For any signal or voltage of interest, when a signal or a voltage is at a high level, it means, strictly speaking, that a level of the signal or the voltage is at a high level, and when a signal or voltage is at a low level, it means, strictly speaking, that a level of the signal or the voltage level is at a low level.

For any transistor formed as a FET (Field Effect Transistor) including a MOSFET, the term "on state" refers to a state in which a drain and a source of the transistor are electrically connected, and the term "off state" refers to a state (cutoff state) in which the drain and source of the transistor are not electrically connected. The same applies to transistors that are not classified as the FET. The MOSFET is understood to be an enhancement mode MOSFET unless otherwise stated. The MOSFET is an abbreviation for "metal-oxide-semiconductor field-effect transistor." Moreover, it may be considered that a back gate is short-circuited to a source in any MOSFET unless otherwise specified.

For any transistor, a period during which the transistor is in an on state is sometimes referred to as an ON period, and a period during which the transistor is in an off state is sometimes referred to as an OFF period. Hereinafter, the on state and the off state for any transistor may be simply expressed as ON and OFF.

FIG. 1 is an overall configuration diagram of a power supply device AA according to an embodiment of the present disclosure. The power supply device AA includes a semiconductor device 1 which is a power supply semiconductor device, a rectifying/smoothing circuit 2, a feedback voltage generating circuit 3, and an input capacitor $C_{IN}$. A voltage source VS is connected to the power supply device AA. The voltage source VS is a DC voltage source configured to generate and output a DC voltage. The voltage source VS may be a battery or a power supply circuit. It may be understood that the voltage source VS is included in components of the power supply device AA. The semiconductor device 1, the rectifying/smoothing circuit 2, the feedback voltage generating circuit 3, and the input capacitor $C_{IN}$ are mounted on a substrate PCB (see FIG. 2) to form the power supply device AA. The voltage source VS may also be mounted on the substrate PCB.

Figure 2:
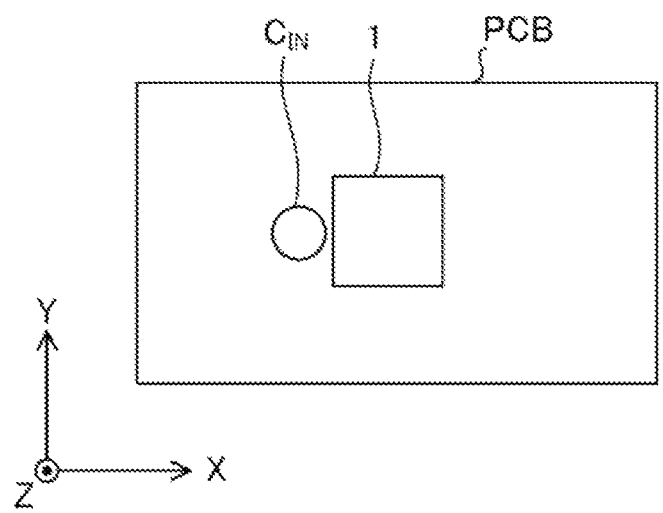
FIG. 2 is a diagram showing a state in which a semiconductor device and an input capacitor are mounted on a substrate according to an embodiment of the present disclosure.

FIG. 2 schematically shows a positional relationship between the semiconductor device 1 and the input capacitor $C_{IN}$ on the substrate PCB. The substrate PCB is a printed substrate on which various electronic components may be mounted. An X-axis, a Y-axis, and a Z-axis are orthogonal to one another. It is assumed that the Z-axis is parallel to an up-down direction (i.e., a vertical direction), and that a direction from a negative side to a positive side of the Z-axis is upward.

The input capacitor $C_{IN}$ is a bypass capacitor configured to supply a power supply voltage $V_{IN}$ to the semiconductor device 1. The power supply voltage $V_{IN}$ may also be referred to as an input voltage. The input capacitor $C_{IN}$ is arranged as close to the semiconductor device 1 as possible. The input capacitor $C_{IN}$ is arranged at least closer to the semiconductor device 1 than the voltage source VS. The input capacitor $C_{IN}$ is connected to the voltage source VS to receive an output voltage of the voltage source VS and is charged with the output voltage of the voltage source VS. Specifically, the voltage source VS includes a positive output terminal and a negative output terminal, and the input capacitor $C_{IN}$ includes a first terminal and a second terminal. Here, it is assumed that the first terminal of the input capacitor $C_{IN}$ is a positive electrode and the second terminal is a negative electrode. The negative output terminal of the voltage source VS and the negative electrode of the input capacitor $C_{IN}$ are connected to the ground. The positive output terminal of the voltage source VS is connected to the positive electrode of input capacitor $C_{IN}$. A power supply voltage $V_{IN}$ is applied to the positive electrode of the input capacitor $C_{IN}$.

The semiconductor device 1 is an electronic component that includes a semiconductor chip including a semiconductor integrated circuit formed on a semiconductor substrate, a housing (package) configured to accommodate the semiconductor chip, and a plurality of external terminals exposed from the housing to the outside of the semiconductor device 1. The semiconductor device 1 is formed by enclosing the semiconductor chip in the housing (package) made of a resin. Although FIG. 1 shows only a switch terminal SW and a feedback terminal FB as a portion of the plurality of external terminals, the semiconductor device 1 is also provided with other external terminals (including terminals TM1 to TM4, which will be described later).

The power supply device AA of FIG. 1 is configured as a step-down DC/DC converter and configured to generate an output voltage $V_{OUT}$ from an input voltage $V_{IN}$. The input voltage $V_{IN}$ and the output voltage $V_{OUT}$ are DC voltages, and the output voltage $V_{OUT}$ is lower than the input voltage $V_{IN}$.

The semiconductor device 1 includes half-bridge circuits 10 and 20 and a drive control circuit 30. The half-bridge circuit 10 includes transistors M1 and M2, and the half-bridge circuit 20 includes transistors M3 and M4. The transistor M1 is a high-side transistor arranged on the higher potential side than the transistor M2, and the transistor M2 is a low-side transistor. Similarly, the transistor M3 is a high-side transistor arranged on the higher potential side than the transistor M4, and the transistor M4 is a low-side transistor. The rectifying/smoothing circuit 2 includes a coil L1 and a capacitor C1. The feedback voltage generating circuit 3 includes resistors R1 and R2. The transistors M1 to M4 are N-channel MOSFETs.

The transistors M1 and M2 are connected in series with each other. The transistors M3 and M4 are connected in series with each other. Specifically, each drain of the transistors M1 and M3 receives the input voltage $V_{IN}$ by being connected to a terminal to which the input voltage $V_{IN}$ is applied. Each source of the transistors M1 and M3 and each drain of the transistors M2 and M4 are commonly connected to the switch terminal SW. Each source of the transistors M2 and M4 is connected to the ground.

Outside the semiconductor device 1, the switch terminal SW is connected to one end of the coil L1, and the other end of the coil L1 is connected to one end of the capacitor C1 and to the output terminal OUT. The other end of the capacitor C1 is connected to the ground. One end of the resistor R1 is connected to the output terminal OUT, and the other end of the resistor R1 is connected to the ground via the resistor R2. An output voltage $V_{OUT}$ is applied to the output terminal OUT. The feedback voltage generating circuit 3 generates a feedback voltage $V_{FB}$ corresponding to the output voltage $V_{OUT}$. Here, the output voltage $V_{OUT}$ is divided by the feedback voltage generating circuit 3 to generate the feedback voltage $V_{FB}$. The feedback voltage $V_{FB}$ is generated at a connection node between the resistors R1 and R2. The feedback voltage $V_{FB}$ is inputted to a feedback terminal FB. The output voltage $V_{OUT}$ itself may be inputted to the feedback terminal FB as the feedback voltage $V_{FB}$. In this case as well, the feedback voltage $V_{FB}$ is a voltage corresponding to the output voltage $V_{OUT}$.

The drive control circuit 30 is connected to the feedback terminal FB and to each gate of the transistors M1 to M4. The drive control circuit 30 controls the on/off of the transistors M1 to M4 by controlling gate potentials of the transistors M1 to M4 based on the feedback voltage $V_{FB}$. The gate signal supplied to each gate of the transistors M1 and M3 by the drive control circuit 30 is referred to as a gate signal GH. The gate signal supplied to each gate of the transistors M2 and M4 by the drive control circuit 30 is referred to as a gate signal GL.

Each of the gate signals GH and GL has a high level or a low level. The transistors M1 and M3 are turned on when the gate signal GH has a high level, and the transistors M1 and M3 are turned off when the gate signal GH has a low level. The transistors M2 and M4 are turned on when the gate signal GL has a high level, and the transistors M2 and M4 are turned off when the gate signal GL has a low level. The low level of the gate signal GL has the ground potential, while the low level of the gate signal GH has the potential of the switch terminal SW. The potential of the gate signal GH of the high level is higher than the input voltage $V_{IN}$. A boosted voltage for turning on the transistors M1 and M3 may be generated by using a known booster circuit (not shown) such as a bootstrap circuit.

The drive control circuit 30 performs switching control to alternately turn on and off a set of transistors M1 and M3 and a set of transistors M2 and M4 based on the feedback voltage $V_{FB}$. When the transistor M1 is turned on, the transistor M3 is also turned on, and when the transistor M1 is turned off, the transistor M3 is also turned off. Similarly, when the transistor M2 is turned on, the transistor M4 is also turned on, and when the transistor M2 is turned off, the transistor M4 is also turned off. A state in which the transistors M1 and M3 are turned on and the transistors M2 and M4 are turned off is referred to as a high output state. A state in which the transistors M1 and M3 are turned off and the transistors M2 and M4 are turned on is referred to as a low output state. In the switching control, the drive control circuit 30 causes the states of the transistors M1 to M4 to alternately transition between the high output state and the low output state. However, in the middle of switching from the high output state to the low output state, or in the middle of switching from the low output state to the high output state, a period in which all of the transistors M1 to M4 are turned off may be provided.

Specifically, for example, in the switching control, the drive control circuit 30 alternately turns on and off the set of the transistors M1 and M3 and the set of the transistors M2 and M4 at a predetermined switching frequency. At this time, an output duty ratio is regulated such that the feedback voltage $V_{FB}$ matches a predetermined reference voltage. The term "output duty ratio" refers to a ratio of the on period of the transistors M1 and M3 to a sum of the on period of the transistors M1 and M3 and the off period of the transistors M1 and M3.

Specifically, the drive control circuit 30 includes, for example, a control circuit configured to generate a control signal so as to reduce a difference between the feedback voltage $V_{FB}$ and the reference voltage, a high-side driver configured to supply a gate signal GH to the transistors M1 and M3 based on a control signal, and a low-side driver configured to supply a gate signal GL to the transistors M2 and M4 based on a control signal. The switching control may be executed by referring to the information on the current flowing through the coil L1 in addition to the feedback voltage $V_{FB}$.

The switching control generates a switching voltage $V_{SW}$ at the switch terminal SW. The switching voltage $V_{SW}$ is a square-wave voltage based on the input voltage $V_{IN}$ (and thus based on the voltage across the input capacitor $C_{IN}$). The switching voltage $V_{SW}$ has substantially the potential of the input voltage $V_{IN}$ in the high output state and substantially the potential of the ground in the low output state. The output voltage $V_{OUT}$ is obtained by rectifying and smoothing the switching voltage $V_{SW}$ in the rectifying/smoothing circuit 2.

Hereinafter, it is considered that the voltage source VS is ignored as being arranged sufficiently far from the semiconductor device 1 in comparison with the input capacitor $C_{IN}$, and the current at and near the switching frequency is supplied from the input capacitor $C_{IN}$ to the semiconductor device 1.

Figure 3:
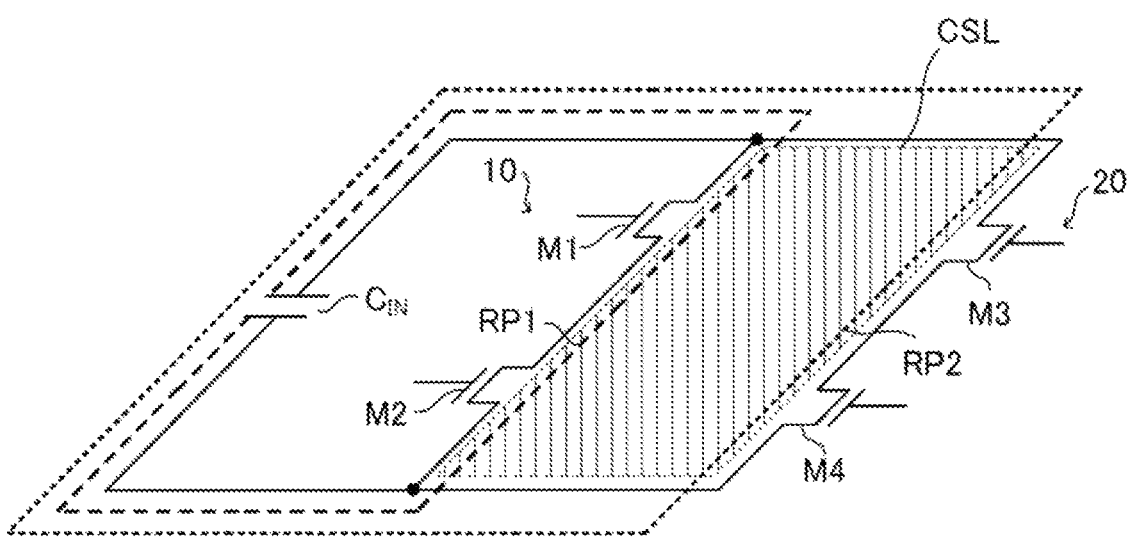
FIG. 3 is a diagram for explaining two current loops in a power supply device according to an embodiment of the present disclosure.

In FIG. 3, a loop RP1 represents a current loop extending from the positive terminal of the input capacitor $C_{IN}$ to the negative terminal of the input capacitor $C_{IN}$ via the transistors M1 and M2. A loop RP2 represents a current loop extending from the positive terminal of the input capacitor $C_{IN}$ to the negative terminal of the input capacitor $C_{IN}$ via the transistors M3 and M4. Although the high-side transistor and the low-side transistor are not turned on at the same time in each half-bridge circuit, during the switching control, a current flows along the current loop RP1 in the half-bridge circuit 10 and a current flows along the current loop RP2 in the half-bridge circuit 20.

At this time, in a case where a magnitude of the current flowing through the current loop RP1 and a magnitude of the current flowing through the current loop RP2 are exactly the same, a magnetic field generated by the former current and a magnetic field generated by the latter current cancel each other. This is called a magnetic field cancellation action or simply a magnetic field cancellation. The magnetic field cancellation occurs in a magnetic field cancellation region CSL indicated by the hatched area in FIG. 3. The magnetic field cancellation region CSL of FIG. 3 includes a region between an arrangement region of the transistors M1 and M2 and an arrangement region of the transistors M3 and M4. The magnetic field cancellation action improves high-frequency EMI (Electromagnetic Interference) characteristics in the semiconductor device 1 and the power supply device AA.

For the magnetic field cancellation, it may be contemplated to equalize current drive capabilities of the transistors M1 and M3 and equalize current drive capabilities of the transistors M2 and M4. However, even in a case where these current drive capabilities are equalized, due to the fact that the length of the current path between the input capacitor $C_{IN}$ and the half-bridge circuit 10 is different from the length of the current path between the input capacitor $C_{IN}$ and the half-bridge circuit 20, a difference occurs between the magnitude of the current flowing through the current loop RP1 and the magnitude of the current flowing through the current loop RP2. As a result, it may be difficult to obtain a required magnetic field cancellation action.

Figure 4:
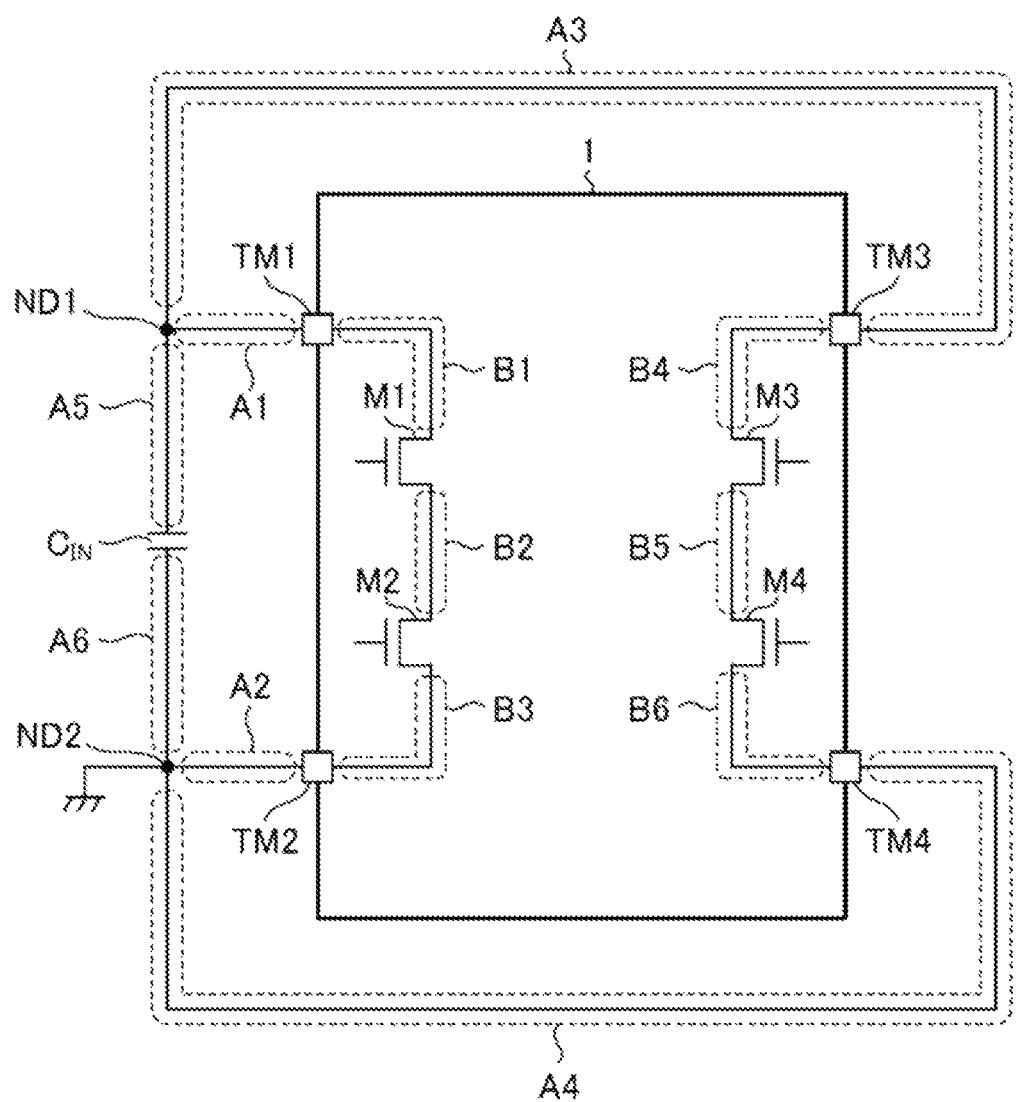
FIG. 4 is an explanatory diagram for a plurality of current paths in a power supply device according to an embodiment of the present disclosure.
Figure 5:
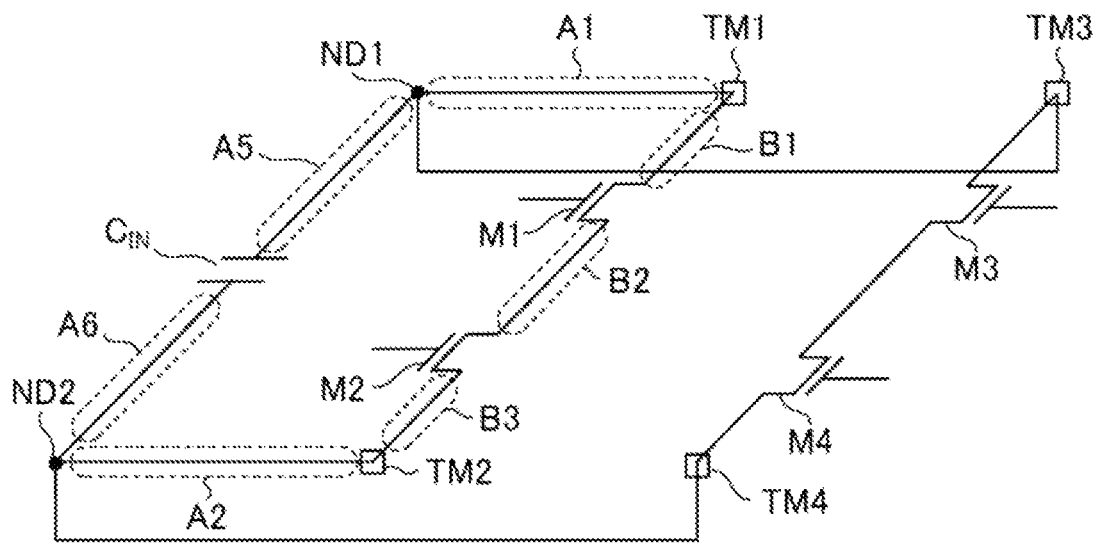
FIG. 5 is an explanatory diagram for a plurality of current paths in a power supply device according to an embodiment of the present disclosure.
Figure 5:
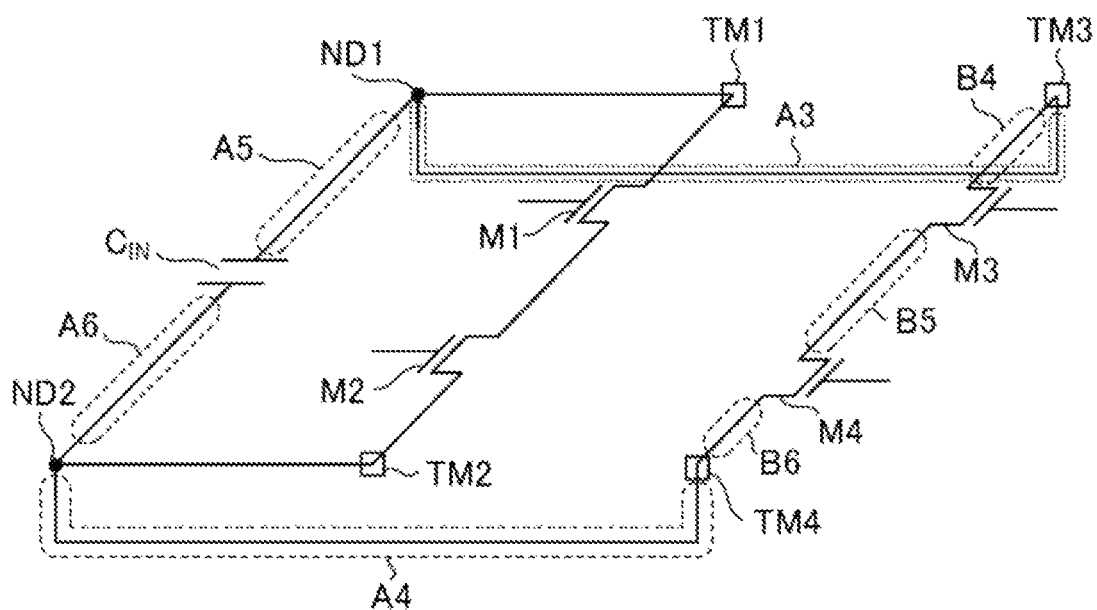

In view of this, the semiconductor device 1 and the power supply device AA are formed to obtain a high magnetic field cancellation action. FIG. 4 is a connection configuration diagram of the input capacitor $C_{IN}$ and the transistors M1 to M4. FIG. 5 illustrates their connection configurations in different expression forms. The semiconductor device 1 is provided with terminals TM1 to TM4, which are four external terminals. The terminals TM1 and TM3 are first and second input terminals which are connected to the positive terminal of the input capacitor $C_{IN}$ to receive the input voltage $V_{IN}$. The terminals TM2 and TM4 are first and second ground terminals which are connected to the negative terminal of the input capacitor $C_{IN}$ to have a ground potential.

Among the current paths provided in the power supply device AA, the current path provided outside the semiconductor device 1 is referred to as an external current path, and the current path provided inside the semiconductor device 1 is referred to as an internal current path. The term "current path" refers to a path through which an electric current flows, and is formed of a metal such as copper or gold. The external current path is mainly formed by a metal wiring provided on the substrate PCB. The internal current path is formed by a metal frame, a metal wiring, pillars (copper pillars), and the like provided in the semiconductor device 1. In FIG. 4, current paths A1 to A6 and B1 to B6 are shown. The current paths A1 to A6 are external current paths, and the current paths B1 to B6 are internal current paths.

The current path A5 is an external current path configured to connect the positive terminal of the input capacitor $C_{IN}$ and a node ND1. That is, the positive electrode of the input capacitor $C_{IN}$ and the node ND1 are connected via the current path A5. The current path A6 is an external current path configured to connect the negative electrode of the input capacitor $C_{IN}$ and a node ND2. That is, the negative electrode of the input capacitor $C_{IN}$ and the node ND2 are connected via the current path A6. The nodes ND1 and ND2 are nodes outside the semiconductor device 1.

The current path A1 is an external current path configured to connect the node ND1 and the terminal TM1. That is, the node ND1 and the terminal TM1 are connected via the current path A1. As a result, the terminal TM1 is connected to the positive terminal of the input capacitor $C_{IN}$ via the current paths A1 and A5. The current path A3 is an external current path configured to connect the node ND1 and the terminal TM3. That is, the node ND1 and the terminal TM3 are connected via the current path A3. As a result, the terminal TM3 is connected to the positive terminal of the input capacitor $C_{IN}$ via the current paths A3 and A5. In some cases, the positive terminal of the input capacitor $C_{IN}$ coincides with the node ND1. In this case, it is understood that the current path A5 does not exist.

The current path A2 is an external current path configured to connect the node ND2 and the terminal TM2. That is, the node ND2 and the terminal TM2 are connected via the current path A2. As a result, the terminal TM2 is connected to the negative terminal of the input capacitor $C_{IN}$ via the current paths A2 and A6. The current path A4 is an external current path configured to connect the node ND2 and the terminal TM4. That is, the node ND2 and the terminal TM4 are connected via the current path A4. As a result, the terminal TM4 is connected to the negative terminal of the input capacitor $C_{IN}$ via the current paths A4 and A6. In some cases, the negative terminal of the input capacitor $C_{IN}$ coincides with the node ND2. In this case, it is understood that the current path A6 does not exist.

The current path B1 is an internal current path configured to connect the terminal TM1 and the drain of the transistor M1. The current path B2 is an internal current path configured to connect the source of the transistor M1 and the drain of the transistor M2. The current path B3 is an internal current path configured to connect the source of the transistor M2 and the terminal TM2. The current path B4 is an internal current path configured to connect the terminal TM3 and the drain of the transistor M3. The current path B5 is an internal current path configured to connect the source of the transistor M3 and the drain of the transistor M4. The current path B6 is an internal current path configured to connect the source of the transistor M4 and the terminal TM4. The source of the transistor M1 and the drain of the transistor M2 are connected to the switch terminal SW via the current path B2, and the source of the transistor M3 and the drain of the transistor M4 are connected to the switch terminal SW via the current path B5 (in FIG. 4, the switch terminal SW is not shown).

The current path B1 includes a first opposing current path, and the current path B4 includes a fourth opposing current path. The first opposing current path and the fourth opposing current path are current paths that are opposed to each other and parallel to each other. Therefore, when currents flow in the same direction through the current paths B1 and B4, a magnetic field cancellation action is obtained between the current paths B1 and B4 (a magnetic field cancellation action is obtained at least between the first opposing current path and the fourth opposing current path).

The current path B2 includes a second opposing current path, and the current path B5 includes a fifth opposing current path. The second opposing current path and the fifth opposing current path are current paths that are opposed to each other and parallel to each other. Therefore, when currents flow in the same direction through the current paths B2 and B5, a magnetic field cancellation action is obtained between the current paths B2 and B5 (a magnetic field cancellation action is obtained at least between the second opposing current path and the fifth opposing current path).

The current path B3 includes a third opposing current path, and the current path B6 includes a sixth opposing current path. The third opposing current path and the sixth opposing current path are current paths that are opposed to each other and parallel to each other. Therefore, when currents flow in the same direction through the current paths B3 and B6, a magnetic field cancellation action is obtained between the current paths B3 and B6 (a magnetic field cancellation action is obtained at least between the third opposing current path and the sixth opposing current path).

Further, it is preferable to arrange the transistors M1 and M3 side by side in a line such that in a high output state, a direction of a current flowing through a channel of the transistor M1 is the same as a direction of a current flowing through a channel of the transistor M3 (it is preferable to form the transistors M1 and M3 in the semiconductor device 1 such that the directions of the currents are the same). Thus, a magnetic field cancellation action is obtained between the transistors M1 and M3.

Similarly, it is preferable to arrange the transistors M2 and M4 side by side in a line such that in a low output state, a direction of a current flowing through a channel of the transistor M2 is the same as a direction of a current flowing through a channel of the transistor M4 (it is preferable to form the transistors M2 and M4 in the semiconductor device 1 such that the directions of the currents are the same). Thus, a magnetic field cancellation action is obtained between the transistors M2 and M4.

Here, impedances of the current paths A1, A2, A3, A4, A5, A6, B1, B2, B3, B4, B5, and B6 are represented by symbols $Z_{A1}$, $Z_{A2}$, $Z_{A3}$, $Z_{A4}$, $Z_{A5}$, $Z_{A6}$, $Z_{B1}$, $Z_{B2}$, $Z_{B3}$, $Z_{B4}$, $Z_{B5}$ and $Z_{B6}$, respectively. Any impedance mentioned in the present embodiment of the present disclosure refers to an impedance at a predetermined frequency $f_{REF}$ or an impedance at a direct current. The predetermined frequency $f_{REF}$ is arbitrary and may be a frequency sufficiently lower than the switching frequency (e.g., several tens of Hz to several kHz). However, the predetermined frequency $f_{REF}$ may be equal to or higher than the switching frequency. The impedance at a direct current corresponds to the resistance value itself. For the sake of convenience of description, the resistance value of the current path at a direct current is also referred to as an impedance.

The on-resistance of the transistor M1 in the high output state is represented by a symbol $R_{ON1}$, and the on-resistance of the transistor M3 in the high output state is represented by a symbol $R_{ON3}$. Similarly, the on-resistance of the transistor M2 in the low output state is represented by a symbol $R_{ON2}$, and the on-resistance of the transistor M4 in the low output state is represented by a symbol $R_{ON4}$. Here, the on-resistance $R_{ON1}$ represents the impedance of the channel of the transistor M1 at a predetermined frequency $f_{REF}$ or direct current (impedance between the drain and the source). Similarly, the on-resistances $R_{ON2}$, $R_{ON3}$, and $R_{ON4}$ represent the impedances of the channels of the transistors M2, M3, and M4, respectively, at a predetermined frequency $f_{REF}$ or direct current.

Figure 6:
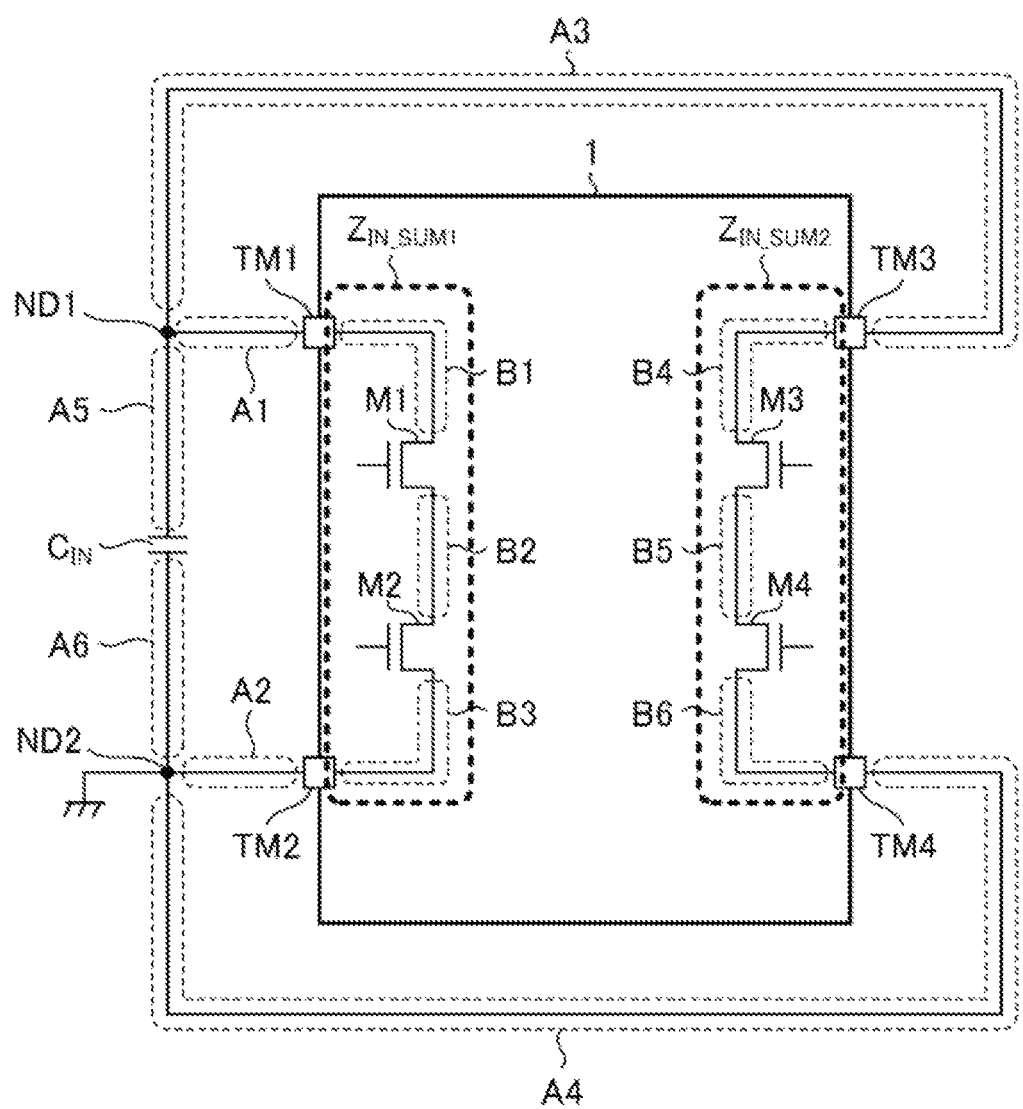
FIG. 6 is a diagram showing a sum of two impedances inside a semiconductor device according to an embodiment of the present disclosure.

Further, impedances $Z_{IN\_SUM1}$ and $Z_{IN\_SUM2}$ are defined as follows (see FIG. 6).

$$Z_{IN\_SUM1}=Z_{B1}+Z_{B2}+Z_{B3}+R_{ON1}+R_{ON2}$$

$$Z_{IN\_SUM2}=Z_{B4}+Z_{B5}+Z_{B6}+R_{ON3}+R_{ON4}$$

The impedance $Z_{IN\_SUM1}$ represents the sum of the impedances inside the semiconductor device 1 (sum of first internal impedances) among the impedances of the current loop RP1. The impedance $Z_{IN\_SUM2}$ represents the sum of the impedances inside the semiconductor device 1 (sum of second internal impedances) among the impedances of the current loop RP2.

In the semiconductor device 1, a circuit (including a current path) may be provided between the terminals TM1 and TM2, a circuit with the same structure as the circuit provided between the terminals TM1 and TM2 may be provided between the terminals TM3 and TM4, and these circuits may be made symmetrical, in an attempt to realize magnetic field cancellation. However, it is difficult to arrange the input capacitor $C_{IN}$ at the center between the former circuit and the latter circuit. In fact, in the power supply device AA, the input capacitor $C_{IN}$ is arranged closer to the set of terminals TM1 and TM2 than to the set of terminals TM3 and TM4. As a result, the current path A1 is shorter than the current path A3. Therefore, the impedance $Z_{A1}$ of the current path A1 is smaller than the impedance $Z_{A3}$ of the current path A3. Similarly, the current path A2 is shorter than the current path A4. Therefore, the impedance $Z_{A2}$ of the current path A2 is smaller than the impedance $Z_{A4}$ of the current path A4.

In this case, in a case where "$Z_{IN\_SUM1}=Z_{IN\_SUM2}$," a difference occurs between the magnitude of the current flowing through the current loop RP1 and the magnitude of the current flowing through the current loop RP2, thereby reducing the magnetic field cancellation action. In view of this, in the semiconductor device 1, a difference is intentionally provided between the impedance $Z_{IN\_SUM1}$ and the impedance $Z_{IN\_SUM2}$. Specifically, the semiconductor device 1 is formed such that "$Z_{IN\_SUM1}>Z_{IN\_SUM2}$," and preferably the semiconductor device 1 is formed such that a first total impedance $Z_{TOTAL1}$ and a second total impedance $Z_{TOTAL2}$ are equal to each other, as represented below.

"$Z_{TOTAL1}=Z_{A1}+Z_{IN\_SUM1}+Z_{A2}$"

"$Z_{TOTAL2}=Z_{A3}+Z_{IN\_SUM2}+Z_{A4}$"

When "$Z_{TOTAL1}=Z_{TOTAL2}$," the magnitude of the current flowing through the current loop RP1 matches the magnitude of the current flowing through the current loop RP2, thereby maximizing the magnetic field cancellation action. Even in a case where "$Z_{TOTAL1}=Z_{TOTAL2}$" does not strictly hold true, an increase in the magnetic field cancellation action may be expected as long as the difference between the impedances $Z_{TOTAL1}$ and $Z_{TOTAL2}$ is brought close to zero. In the power supply device AA in which "$Z_{A1}<Z_{A3}$" and "$Z_{A2}<Z_{A4}$" hold true, in a case where "$Z_{IN\_SUM1}>Z_{IN\_SUM2}$" holds true, the difference between the impedances $Z_{TOTAL1}$ and $Z_{TOTAL2}$ is reduced. As a method of realizing "$Z_{IN\_SUM1}>Z_{IN\_SUM2}$" (a method of bringing the difference between the impedances $Z_{TOTAL1}$ and $Z_{TOTAL2}$ close to zero), any one of the following first and second drive capacity regulation methods, or any one of the following first, second, and third current path regulation methods may be adopted. Any two or more of the first and second drive capacity regulation methods and the first, second, and third current path regulation methods may be used in combination.

In the first drive capacity regulation method, "$Z_{IN\_SUM1}>Z_{IN\_SUM2}$" is realized by forming the semiconductor device 1 such that "$R_{ON1}>R_{ON3}$" holds true. In the first drive capacity regulation method, "$Z_{B1}=Z_{B4}$," "$Z_{B2}=Z_{B5}$," "$Z_{B3}=Z_{B6}$," and "$R_{ON2}=R_{ON4}$" may hold true. In the first drive capacity regulation method, any one or more of "$Z_{B1}>Z_{B4}$," "$Z_{B2}>Z_{B5}$," "$Z_{B3}>Z_{B6}$," and "$R_{ON2}>R_{ON4}$" may hold true.

In the second drive capacity regulation method, "$Z_{IN\_SUM1}>Z_{IN\_SUM2}$" is realized by forming the semiconductor device 1 such that "$R_{ON2}>R_{ON4}$" holds true. In the second drive capacity regulation method, "$Z_{B1}=Z_{B4}$," "$Z_{B2}=Z_{B5}$," "$Z_{B3}=Z_{B6}$," and "$R_{ON1}=R_{ON3}$" may hold true. In the second drive capacity regulation method, any one or more of "$Z_{B1}>Z_{B4}$," "$Z_{B2}>Z_{B5}$," "$Z_{B3}>Z_{B6}$," and "$R_{ON1}>R_{ON3}$" may hold true.

In particular, it is preferable to implement the first and second drive capacity regulation methods in combination. In this combination, "$Z_{IN\_SUM1}>ZI_{N\_SUM2}$" is realized by forming the semiconductor device 1 such that "$R_{ON1}>R_{ON3}$" and "$R_{ON2}>R_{ON4}$" hold true. At this time, "$Z_{B1}=Z_{B4}$," "$Z_{B2}=Z_{B5}$" and "$Z_{B3}=Z_{B6}$" may hold true, or any one or more of "$Z_{B1}>Z_{B4}$," "$Z_{B2}>Z_{B5}$," and "$Z_{B3}>Z_{B6}$" may hold true.

In the first current path regulation method, "$Z_{IN\_SUM1}>Z_{IN\_SUM2}$" is realized by forming the semiconductor device 1 such that "$Z_{B1}>Z_{B4}$" holds true. In the first current path regulation method, "$Z_{B2}=Z_{B5}$," "$Z_{B3}=Z_{B6}$," "$R_{ON1}=R_{ON3}$," and "$R_{ON2}=R_{ON4}$" may hold true. In the first current path regulation method, any one or more of "$Z_{B2}>Z_{B5}$," "$Z_{B3}>Z_{B6}$," "$R_{ON1}>R_{ON3}$," and "$R_{ON2}>R_{ON4}$" may hold true.

In the second current path regulation method, "$Z_{IN\_SUM1}>Z_{IN\_SUM2}$" is realized by forming the semiconductor device 1 such that "$Z_{B3}>Z_{B6}$" holds true. In the second current path regulation method, "$Z_{B1}=Z_{B4}$," "$Z_{B2}=Z_{B5}$," "$R_{ON1}=R_{ON3}$," and "$R_{ON2}=R_{ON4}$" may hold true. In the second current path regulation method, any one or more of "$Z_{B1}>Z_{B4}$," "$Z_{B2}>Z_{B5}$," "$R_{ON1}>R_{ON3}$," and "$R_{ON2}>R_{ON4}$" may hold true.

In particular, it is preferable to implement the first and second current path regulation methods in combination. In this combination, "$Z_{IN\_SUM1}>Z_{IN\_SUM2}$" is realized by forming the semiconductor device 1 such that "$Z_{B1}>Z_{B4}$" and "$Z_{B3}>Z_{B6}$" hold true. At this time, "$Z_{B2}=Z_{B5}$," "$R_{ON1}=R_{ON3}$," and "$R_{ON2}=R_{ON4}$" may hold true, or any one or more of "$Z_{B2}>Z_{B5}$", "$R_{ON1}>R_{ON3}$", and "$R_{ON2}>R_{ON4}$" may hold true.

In the third current path regulation method, "$Z_{IN\_SUM1}>Z_{IN\_SUM2}$" is realized by forming the semiconductor device 1 such that "$Z_{B2}>Z_{B5}$" holds true. In the third current path regulation method, "$Z_{B1}=Z_{B4}$," "$Z_{B3}=Z_{B6}$," "$R_{ON1}=R_{ON3}$," and "$R_{ON2}=R_{ON4}$" may hold true. In the first current path regulation method, any one or more of "$Z_{B1}>Z_{B4}$," "$Z_{B3}>Z_{B6}$," "$R_{ON1}>R_{ON3}$," and "$R_{ON2}>R_{ON4}$" may hold true.

According to the present embodiment, it is possible to obtain a good magnetic field cancellation act when driving two half-bridge circuits by using one input capacitor.

Hereinafter, some specific operation examples, applied techniques, modified techniques, and the like will be described in a plurality of embodiments. The matters described above in the present embodiment are applied to each of the following embodiments unless otherwise stated and unless contradictory. In each embodiment, in a case where there are matters that contradict the above-described matters, the description in each embodiment may take precedence. In addition, as long as there is no contradiction, the matters described in any of the following embodiments may be applied to any other embodiment (that is, any two or more embodiments among a plurality of embodiments may be combined).

First Embodiment

A first embodiment of the present disclosure will be described. Although it is relatively easy to eliminate the difference between the resistance component in the current loop RP1 and the resistance component in the current loop RP2, it is difficult to match the inductance component in the current loop RP1 and the inductance component in the current loop RP2. In the configuration assumed in the present embodiment (see FIG. 4), the inductance components in the current paths A3 and A4 are larger than the inductance components in the current paths A1 and A2. Therefore, at the time of switching between the low output state and the high output state, relatively large ringing (overshoot and undershoot) may occur at the terminal TM3 or TM4 due to the inductance component of the current path A3 or A4. Such ringing may cause a malfunction in the semiconductor device 1 or other devices (not shown) configured to operate with the input voltage $V_{IN}$.

Figure 7:
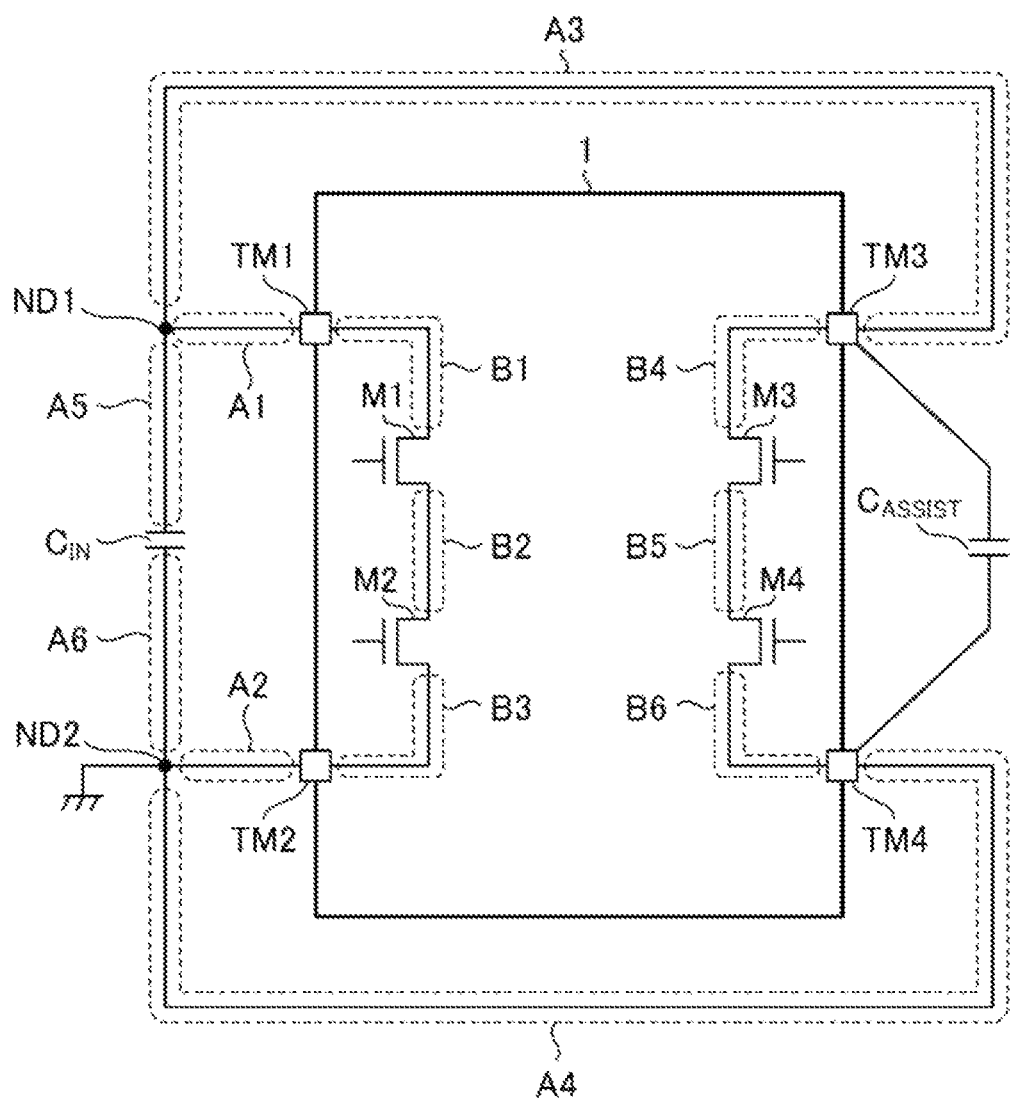
FIG. 7 is a diagram showing a state in which an auxiliary capacitor is additionally connected to the semiconductor device according to a first embodiment belonging to an embodiment of the present disclosure.

In view of this, as shown in FIG. 7, an auxiliary capacitor $C_{ASSIST}$ may be added to the power supply device AA. A first terminal (positive electrode) of the auxiliary capacitor $C_{ASSIST}$ is connected to the terminal TM3, and a second terminal (negative electrode) of the auxiliary capacitor $C_{ASSIST}$ is connected to the terminal TM4. Therefore, the input voltage $V_{IN}$ is applied across the auxiliary capacitor $C_{ASSIST}$. The auxiliary capacitor $C_{ASSIST}$ is mounted on the substrate PCB. At this time, the auxiliary capacitor $C_{ASSIST}$ is arranged closer to the set of terminals TM3 and TM4 than to the set of terminals TM1 and TM2.

As a result, an inductor component between the auxiliary capacitor $C_{ASSIST}$ and the terminals TM3 and TM4 becomes smaller than an inductor component between the input capacitor $C_{IN}$ and the terminals TM3 and TM4. Specifically, the length of the current path interposed between the first terminal of the auxiliary capacitor $C_{ASSIST}$ and the terminal TM3 is shorter than the sum of the lengths of the current paths A3 and A5 and shorter than the length of the current path A3. The length of the current path interposed between the second terminal of the auxiliary capacitor $C_{ASSIST}$ and the terminal TM4 is shorter than the sum of the lengths of the current paths A4 and A6 and shorter than the length of the current path A4.

When switching between the high output state and the low output state, it is sufficient to supply a required current from the auxiliary capacitor $C_{ASSIST}$ to the half-bridge circuit 20 for a short period of time. Therefore, a capacitance value of the auxiliary capacitor $C_{ASSIST}$ may be smaller than a capacitance value of the input capacitor $C_{IN}$. Further, it is not necessary to make a layout between the input capacitor $C_{IN}$ and the terminals TM1 and TM2 symmetrical with a layout between the auxiliary capacitor $C_{ASSIST}$ and the terminals TM3 and TM4. According to the present embodiment, it is possible to suppress the ringing described above.

Second Embodiment

A second embodiment of the present disclosure will be described. In the second embodiment, a method of realizing "$R_{ON1}>R_{ON3}$" and "$R_{ON2}>R_{ON4}$" by the above-described first and second drive capacity regulation methods will be described.

As a method of causing "$R_{ON1}>R_{ON3}$" to hold true, there is a method of making the size of the transistor M1 smaller than the size of the transistor M3. By doing so, when a common high-level gate signal GH is supplied to the gates of the transistors M1 and M3, the on-resistance $R_{ON1}$ of the transistor M1 may be made greater than the on-resistance $R_{ON3}$ of the transistor M3, whereby a current balance is obtained between the current loops RP1 and RP2. The size difference between the transistors M1 and M3 may be a source area difference between the transistors M1 and M3.

Alternatively, a modification MD1 may be implemented in which separate gate signals GH are supplied to the transistors M1 and M3. In the modification MD1, the gate signal GH for the transistor M1 is called a gate signal GH1, and the gate signal GH for the transistor M3 is called a gate signal GH3. Then, the drive control circuit 30 according to the modification MD1 supplies high-level gate signals GH1 and GH3 to the gates of the transistors M1 and M3 to control the transistors M1 and M3 into an on state. At this time, the potential of the high-level gate signal GH1 is made lower than the potential of the high-level gate signal GH3. Thus, "$R_{ON1}>R_{ON3}$" holds true. In the modification MD1, the potentials of the low-level gate signals GH1 and GH3 may be the same (both of which may be equal to the potential of the switch terminal SW). In the modification MD1, a size, a structure, and electrical characteristics of the transistor M1 may be the same as a size, a structure, and electrical characteristics of the transistor M3.

As a method of making "$R_{ON2}>R_{ON4}$" hold true, there is a method of making the size of the transistor M2 smaller than the size of the transistor M4. By doing so, when a common high-level gate signal GL is supplied to the gates of transistors M2 and M4, the on-resistance $R_{ON2}$ of the transistor M2 may be made greater than the on-resistance $R_{ON4}$ of the transistor M4, whereby a current balance is obtained between the current loops RP1 and RP2. The size difference between the transistors M2 and M4 may be a source area difference between the transistors M2 and M4.

Alternatively, a modification MD2 may be implemented in which separate gate signals GL are supplied to the transistors M2 and M4. In the modification MD2, the gate signal GL for the transistor M2 is called a gate signal GL2, and the gate signal GL for the transistor M4 is called a gate signal GL4. Then, a drive control circuit 30 according to the modification MD2 supplies high-level gate signals GL2 and GL4 to the gates of the transistors M2 and M4 to control the transistors M2 and M4 into an on state. At this time, the potential of the high-level gate signal GL2 is made lower than the potential of the high-level gate signal GL4. Thus, "$R_{ON2}>R_{ON4}$" holds true. In the modification MD2, the potentials of the low-level gate signals GL2 and GL4 may be the same (both of which may be equal to the ground potential). In the modification MD2, a size, a structure, and electrical characteristics of the transistor M2 may be the same as a size, a structure, and electrical characteristics of the transistor M4.

Third Embodiment

A third embodiment will be described. The first, second or third current path regulation method described above is realized by regulating an impedance of the metal frame, pillar (copper pillar) or metal wiring that forms the current path B1, B2 or B3. A specific configuration example for realizing this will be described. Here, it is assumed that the semiconductor device 1 is mounted on the substrate PCB by a flip-chip bonding method.

Figure 8:
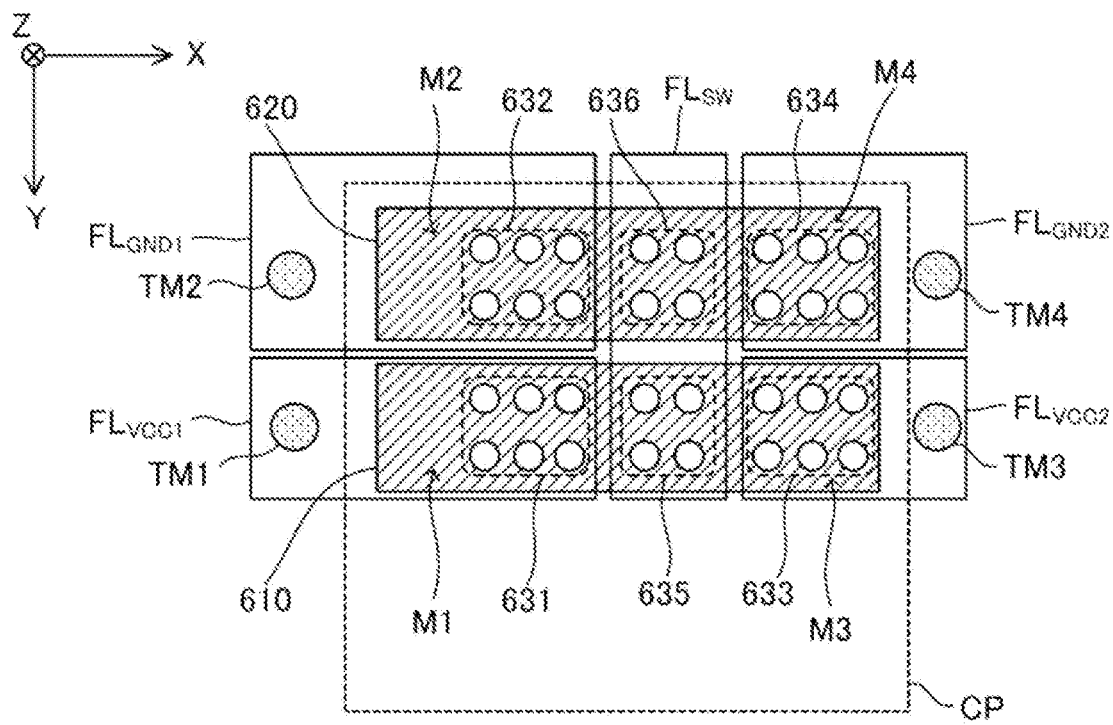
FIG. 8 is a diagram schematically showing a positional relationship of some constituent components of a semiconductor device when the semiconductor device is observed from a back surface thereof, in a third embodiment belonging to an embodiment of the present disclosure.

FIG. 8 is a diagram schematically showing a positional relationship of some components of the semiconductor device 1 when the semiconductor device 1 is observed from a back surface thereof. The back surface corresponds to the lower surface. In FIG. 8, the component CP is a semiconductor chip on which a semiconductor integrated circuit including transistors M1 to M4 is formed. An outer shape of the semiconductor chip CP is indicated by a dashed square frame.

The semiconductor device 1 is provided with frames $FL_{VCC1}$, $FL_{VCC2}$, $FL_{GND1}$, $FL_{GND2}$ and $FL_{SW}$, which are metal frames. The frames $FL_{VCC1}$ and $FL_{GND1}$ are arranged side by side along the Y-axis direction, and the frames $FL_{VCC2}$ and $FL_{GND2}$ are arranged side by side along the Y-axis direction. The frames $FL_{VCC2}$ and $FL_{GND2}$ are arranged on the positive side of the X-axis along the X-axis direction when viewed from the frames $FL_{VCC1}$ and $FL_{GND1}$. The frame $FL_{SW}$ is provided between the frames $FL_{VCC1}$ and $FL_{GND1}$ and the frames $FL_{VCC2}$ and $FL_{GND2}$.

Some portions of lower surfaces of the frames $FL_{VCC1}$, $FL_{GND1}$, $FL_{VCC2}$ and $FL_{GND2}$ function as terminals TM1, TM2, TM3 and TM4, respectively. In FIG. 8, arrangement positions of the terminals TM1 to TM4 are indicated by dot regions. The terminal TM1 is arranged at the X-axis negative end of the frame $FL_{VCC1}$. The terminal TM2 is arranged at the X-axis negative end of the frame $FL_{GND1}$. The terminal TM3 is arranged at the X-axis positive end of the frame $FL_{VCC2}$. The terminal TM4 is arranged at the X-axis positive end of the frame $FL_{GND2}$. Although not shown in FIG. 8, the switch terminal SW is provided on the lower surface of the frame $FL_{SW}$. The input capacitor $C_{IN}$ is arranged on the X-axis negative side with respect to the terminals TM1 and TM2. Therefore, the input capacitor $C_{IN}$ is located closer to the set of terminals TM1 and TM2 than to the set of terminals TM3 and TM4.

In FIG. 8, a hatched region 610 represents a transistor region in which the transistors M1 and M3 are formed, and a hatched region 620 represents a transistor region in which the transistors M2 and M4 are formed. Here, it is assumed that the semiconductor regions in which the drains of the transistors M1 and M3 are formed are coupled to each other and the semiconductor regions in which the sources of the transistors M1 and M3 are formed are coupled to each other. However, the transistors M1 and M3 may be two completely isolated transistors. Similarly, it is assumed herein that the semiconductor regions in which the drains of the transistors M2 and M4 are formed are coupled to each other and the semiconductor regions in which the sources of the transistors M2 and M4 are formed are coupled to each other. However, the transistors M2 and M4 may be two completely isolated transistors.

The frame $FL_{VCC1}$ and the semiconductor region in which the drain of the transistor M1 is formed are connected via a pillar group 631. The frame $FL_{GND1}$ and the semiconductor region in which the source of the transistor M2 is formed are connected via a pillar group 632. The frame $FL_{VCC2}$ and the semiconductor region in which the drain of the transistor M3 is formed are connected via a pillar group 633. The frame $FL_{GND2}$ and the semiconductor region in which the source of the transistor M4 is formed are connected via a pillar group 634. The frame $FL_{SW}$ and the semiconductor regions in which the sources of the transistors M1 and M3 are formed are connected via a pillar group 635. The frame $FL_{SW}$ and the semiconductor regions in which the drains of the transistors M2 and M4 are formed are connected via a pillar group 636. Each pillar group includes a plurality of pillars. Each of the pillars is mainly made of copper and is substantially formed in a shape of a cylinder (an axis of the cylinder is parallel to the Z-axis).

It should be noted herein that a first distance from the terminal TM1 to the pillar group 631 is longer than a third distance from the terminal TM3 to the pillar group 633. Since the frame $FL_{VCC1}$ is a component of the current path B1 and the frame $FL_{VCC2}$ is a component of the current path B4 (see FIG. 4), "$Z_{B1} > Z_{B4}$" holds true due to the difference between the first and third distances. Similarly, a second distance from the terminal TM2 to the pillar group 632 is greater than a fourth distance from the terminal TM4 to the pillar group 634. Since the frame $FL_{GND1}$ is a component of the current path B3 and the frame $FL_{GND2}$ is a component of the current path B6 (see FIG. 4), "$Z_{B3} > Z_{B6}$" holds true due to the difference between the second and fourth distances. It may be understood that a distance from a certain terminal of interest to a pillar group of interest refers to a distance from the terminal of interest to a center position or a center of gravity of the pillar group of interest. Therefore, for example, the first distance may be understood to refer to the distance from the terminal TM1 to the center position or the center of gravity of the pillar group 631.

In the example of FIG. 8, the number of pillars constituting the pillar group 631 and the number of pillars constituting the pillar group 633 are the same, and the number of pillars constituting the pillar group 632 and the number of pillars constituting the pillar group 634 are the same.

Figure 9:
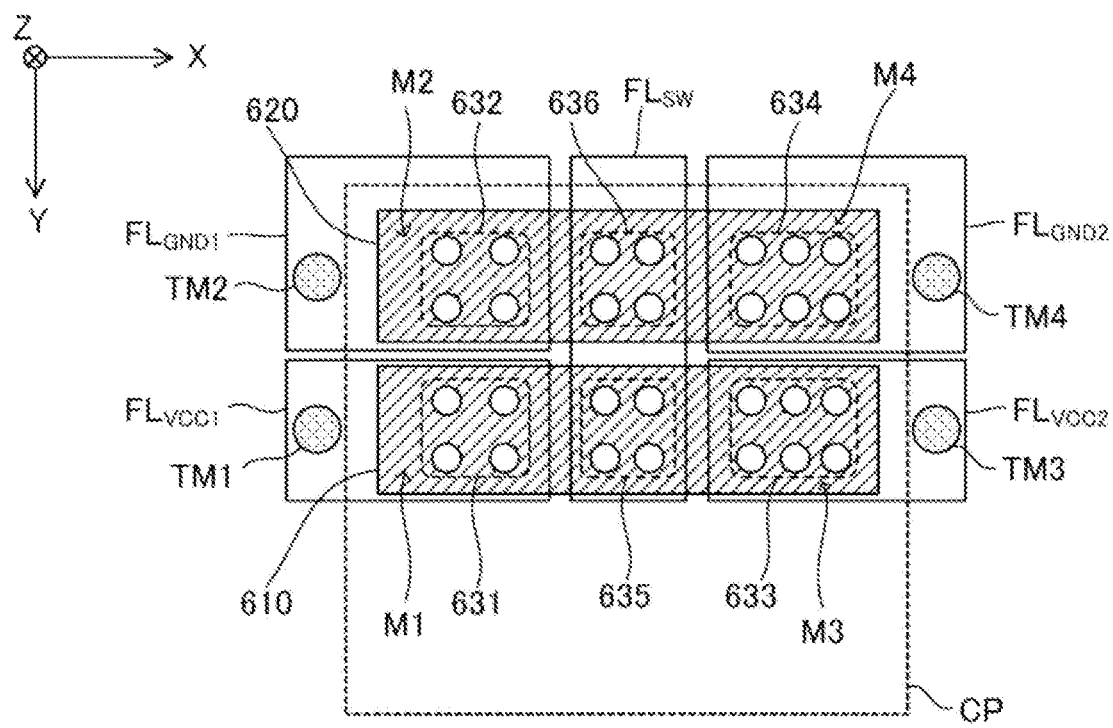
FIG. 9 is a diagram schematically showing a positional relationship of some constituent components of a semiconductor device when the semiconductor device is observed from a back surface thereof, in a third embodiment belonging to an embodiment of the present disclosure.

As shown in FIG. 9, the number of pillars constituting the pillar group 631 may be less than the number of pillars constituting the pillar group 633. In this case, the first distance and the third distance may be equal to each other. Due to the difference in the number of pillars, "$Z_{B1} > Z_{B4}$" holds true. Similarly, as shown in FIG. 9, the number of pillars constituting the pillar group 632 may be less than the number of pillars constituting the pillar group 634. In this case, the second distance and the fourth distance may be equal to each other. Due to the difference in the number of pillars, "$Z_{B3} > Z_{B6}$" holds true.

In addition, a width of a metal wiring through which the drain current of the transistor M1 flows may be made smaller than a width of a metal wiring through which the drain current of the transistor M3 flows, or the former metal wiring may be made longer than the latter metal wiring, such that an impedance of the former metal wiring becomes larger than an impedance of the latter metal wiring. This also makes it possible to achieve "$Z_{B1} > Z_{B4}$." Similarly, a width of the metal wiring through which the drain current of the transistor M2 flows may be made smaller than a width of the metal wiring through which the drain current of the transistor M4 flows, or the former metal wiring may be made longer than the latter metal wiring, such that an impedance of the former metal wiring becomes larger than an impedance of the latter metal wiring. This also makes it possible to achieve "$Z_{B3} > Z_{B6}$." The metal wiring described herein refers to the metal wiring within the semiconductor device 1.

Fourth Embodiment

A fourth embodiment will be described. In the fourth embodiment, some modifications or supplemental matters will be described.

Types of channels of FETs (Field Effect Transistors) shown in the embodiment are examples. Without detracting from the spirit of the above description, the type of channel of any FET may be changed between a P-channel type and an N-channel type. For example, the transistors M1 and M3 may be P-channel MOSFETs. In this case, the source of the transistor M1 is connected to the terminal TM1 via the current path B1, the source of the transistor M3 is connected to the terminal TM3 via the current path B4, the drain of the transistor M1 is connected to the drain of the transistor M2 via the current path B2, and the drain of the transistor M3 is connected to the drain of the transistor M4 via the current path B5.

For any signal or voltage, the relationship between the high-level and the low-level thereof may be reversed from that described above without departing from the spirit described above. When the transistors M1 and M3 are P-channel MOSFETs, the transistors M1 and M3 are turned off when the gate signal GH is at a high level, and the transistors M1 and M3 are turned on when the gate signal GH is at a low level.

Each of the transistors described above may be any type of transistor, as long as there is no inconvenience. For example, each of the transistors described above as a MOSFET may be replaced with a junction FET, an IGBT (Insulated Gate Bipolar Transistor), or a bipolar transistor as long as it does not cause any inconvenience. Each of the transistors includes a first electrode, a second electrode, and a control electrode. In the FET, one of the first and second electrodes is a drain, the other is a source, and the control electrode is a gate. In the IGBT, one of the first and second electrodes is a collector, the other is an emitter, and the control electrode is a gate. In the bipolar transistor not belonging to the IGBT, one of the first and second electrodes is a collector, the other is an emitter, and the control electrode is a base.

In the present disclosure, an arbitrary first physical quantity and an arbitrary second physical quantity being "the same" is interpreted as a concept including an error. That is, the first physical quantity and the second physical quantity being "the same" means that designing or manufacturing is aimed at making the first physical quantity and the second physical quantity "the same." Even in a case where there is a slight error between the first physical quantity and the second physical quantity, it should be understood that the first physical quantity and the second physical quantity are "the same." This is not limited to the physical quantities (for example, this may equally apply to an expression that a first structure and a second structure are the same). Expressions similar to "the same" (e.g., "identical" or "match") should be interpreted similarly.

The embodiments of the present disclosure may be appropriately modified in various ways within the scope of the technical idea defined in the claims. The above-described embodiments are merely examples of the embodiment of the present disclosure. The meanings of the terms of the present disclosure and each constituent requirement are not limited to those of the embodiments described above. The specific numerical values given in the above-described description are merely examples and may, of course, be changed to various numerical values.

<<Supplementary Notes>>

Supplementary notes are provided with regard to the present disclosure in which specific configuration examples are shown in the above-described embodiments of the present disclosure.

A power supply semiconductor device (1) according to an embodiment of the present disclosure includes: a first external terminal (TM1) configured to be connected to a positive electrode of an input capacitor ($C_{IN}$) via a first external current path (A1); a second external terminal (TM2) configured to be connected to a negative electrode of the input capacitor via a second external current path (A2); a third external terminal (TM3) configured to be connected to the positive electrode of the input capacitor via a third external current path (A3); a fourth external terminal (TM4) configured to be connected to the negative electrode of the input capacitor via a fourth external current path (A4); a first transistor (M1) and a second transistor (M2) provided between the first external terminal and the second external terminal and connected in series to each other; a third transistor (M3) and a fourth transistor (M4) provided between the third external terminal and the fourth external terminal and connected in series to each other; a switch terminal (SW) commonly connected to a connection node between the first transistor and the second transistor and a connection node between the third transistor and the fourth transistor; and a drive control circuit (30) configured to perform a switching control to alternately turn on and off a set of the first transistor and the third transistor and a set of the second transistor and the fourth transistor, thereby generating a switching voltage ($V_{SW}$) at the switch terminal based on a voltage across the input capacitor, wherein an output voltage ($V_{OUT}$) is obtained by rectifying and smoothing the switching voltage, wherein each of the first, second, third, and fourth transistors includes a first electrode, a second electrode, and a control electrode, wherein the drive control circuit is further configured to control an on/off state of each of the first, second, third, and fourth transistors by controlling a potential of the control electrode of each of the first, second, third and fourth transistors based on a feedback voltage ($V_{FB}$) corresponding to the output voltage, wherein the second electrode of each of the first transistor and the third transistor and the first electrode of each of the second transistor and the fourth transistor are commonly connected to the switch terminal, wherein the power supply semiconductor device further includes: a first internal current path (B1) configured to connect the first external terminal and the first electrode of the first transistor, a second internal current path (B2) configured to connect the second electrode of the first transistor and the first electrode of the second transistor, a third internal current path (B3) configured to connect the second electrode of the second transistor and the second external terminal, a fourth internal current path (B4) configured to connect the third external terminal and the first electrode of the third transistor, a fifth internal current path (B5) configured to connect the second electrode of the third transistor and the first electrode of the fourth transistor, and a sixth internal current path (B6) configured to connect the second electrode of the fourth transistor and the fourth external terminal, wherein a first internal impedance sum ($Z_{IN\_SUM1}$) and a second internal impedance sum ($Z_{IN\_SUM2}$) for a predetermined frequency or direct current are different from each other, wherein the first internal impedance sum is a sum of impedances ($Z_{B1}$, $Z_{B2}$ and $Z_{B3}$) of the first, second, and third internal current paths and on-resistances ($R_{ON1}$ and $R_{ON2}$) of the first transistor and the second transistor, and wherein the second internal impedance sum is a sum of impedances ($Z_{B4}$, $Z_{B5}$, and $Z_{B6}$) of the fourth, fifth, and sixth internal current paths and on-resistances ($R_{ON3}$ and $R_{ON4}$) of the third transistor and the fourth transistor (First Configuration).

As a result, even when the input capacitor cannot be located at the center of the set of the first and second external terminals and the set of the third and fourth external terminals, it is possible to obtain an effective magnetic field cancellation action.

In the power supply semiconductor device of the First Configuration, the input capacitor may be arranged closer to a set of the first external terminal and the second external terminal than a set of the third external terminal and the fourth external terminal, and the first internal impedance sum may be larger than the second internal impedance sum (Second Configuration).

As a result, a current balance is obtained between the current loop passing via the first and second transistors and the current loop passing via the third and fourth transistors. This makes it possible to obtain an effective magnetic field cancellation action.

In the power supply semiconductor device of the Second Configuration, for the predetermined frequency or direct current, an impedance ($Z_{A1}$) of the first external current path may be smaller than an impedance ($Z_{A3}$) of the third external current path, and an impedance ($Z_{A2}$) of the second external current path may be smaller than an impedance of the fourth external current path ($Z_{A4}$) (Third Configuration).

In the power supply semiconductor device of the Third Configuration, a sum ($Z_{TOTAL1}$) of the impedance of the first external current path, the first internal impedance sum, and the impedance of the second external current path may be equal to a sum ($Z_{TOTAL2}$) of the impedance of the third external current path, the second internal impedance sum, and the impedance of the fourth external current path (Fourth Configuration).

As a result, a current balance is obtained between the current loop passing via the first and second transistors and the current loop passing via the third and fourth transistors. This makes it possible to obtain an effective magnetic field cancellation action.

In the power supply semiconductor device of any one of the Second to Fourth Configurations, the first internal impedance sum may be made larger than the second internal impedance sum by making the on-resistance of the first transistor larger than the on-resistance of the third transistor, by making the on-resistance of the second transistor larger than the on-resistance of the fourth transistor, or by making the on-resistance of the first transistor larger than the on-resistance of the third transistor and making the on-resistance of the second transistor larger than the on-resistance of the fourth transistor (Fifth Configuration).

In the power supply semiconductor device of any one of the Second to Fifth Configurations, the first internal impedance sum may be made larger than the second internal impedance sum by making the impedance of the first internal current path larger than the impedance of the fourth internal current path, by making the impedance of the third internal current path larger than the impedance of the sixth internal current path, or by making the impedance of the first internal current path larger than the impedance of the fourth internal current path and making the impedance of the third internal current path larger than the impedance of the sixth internal current path (Sixth Configuration).

In the power supply semiconductor device of any one of the Second to Sixth Configurations, an auxiliary capacitor ($C_{ASSIST}$) different from the input capacitor may be connected between the third external terminal and the fourth external terminal, and the auxiliary capacitor may be arranged closer to the set of the third external terminal and the fourth external terminal than the set of the first external terminal and the second external terminal (Seventh Configuration).

As a result, it is possible to suppress ringing that may occur at the third external terminal or the fourth external terminal when the transistor is switched on and off.

A DC/DC converter according to an embodiment of the present disclosure includes: the power supply semiconductor device of any one of the First to Sixth Configurations; a rectifying/smoothing circuit (2) connected to the switch terminal and configured to generate the output voltage by rectifying and smoothing the switching voltage at the switch terminal; and the input capacitor (Eighth Configuration).

A DC/DC converter according to an embodiment of the present disclosure includes: the power supply semiconductor device of the Seventh Configuration; a rectifying/smoothing circuit (2) connected to the switch terminal and configured to generate the output voltage by rectifying and smoothing the switching voltage at the switch terminal; the input capacitor; and the auxiliary capacitor (Ninth Configuration).

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply semiconductor device, comprising:
a first external terminal configured to be connected to a positive electrode of an input capacitor via a first external current path;
a second external terminal configured to be connected to a negative electrode of the input capacitor via a second external current path;
a third external terminal configured to be connected to the positive electrode of the input capacitor via a third external current path;
a fourth external terminal configured to be connected to the negative electrode of the input capacitor via a fourth external current path;
a first transistor and a second transistor provided between the first external terminal and the second external terminal and connected in series to each other;
a third transistor and a fourth transistor provided between the third external terminal and the fourth external terminal and connected in series to each other;
a switch terminal commonly connected to a connection node between the first transistor and the second transistor and a connection node between the third transistor and the fourth transistor; and
a drive control circuit configured to perform a switching control to alternately turn on and off a set of the first transistor and the third transistor and a set of the second transistor and the fourth transistor, thereby generating a switching voltage at the switch terminal based on a voltage across the input capacitor,
wherein an output voltage is obtained by rectifying and smoothing the switching voltage,
wherein each of the first, second, third, and fourth transistors includes a first electrode, a second electrode, and a control electrode,
wherein the drive control circuit is further configured to control an on/off state of each of the first, second, third, and fourth transistors by controlling a potential of the control electrode of each of the first, second, third, and fourth transistors based on a feedback voltage corresponding to the output voltage,
wherein the second electrode of each of the first transistor and the third transistor and the first electrode of each of the second transistor and the fourth transistor are commonly connected to the switch terminal,
wherein the power supply semiconductor device further comprises:
a first internal current path configured to connect the first external terminal and the first electrode of the first transistor;
a second internal current path configured to connect the second electrode of the first transistor and the first electrode of the second transistor;
a third internal current path configured to connect the second electrode of the second transistor and the second external terminal;
a fourth internal current path configured to connect the third external terminal and the first electrode of the third transistor;
a fifth internal current path configured to connect the second electrode of the third transistor and the first electrode of the fourth transistor; and
a sixth internal current path configured to connect the second electrode of the fourth transistor and the fourth external terminal, wherein a first internal impedance sum and a second internal impedance sum for a predetermined frequency or direct current are different from each other, wherein the first internal impedance sum is a sum of impedances of the first, second, and third internal current paths and on-resistances of the first transistor and the second transistor, and wherein the second internal impedance sum is a sum of impedances of the fourth, fifth, and sixth internal current paths and on-resistances of the third transistor and the fourth transistor.

2. The power supply semiconductor device of claim 1, wherein the input capacitor is arranged closer to a set of the first external terminal and the second external terminal than a set of the third external terminal and the fourth external terminal, and wherein the first internal impedance sum is larger than the second internal impedance sum.

3. The power supply semiconductor device of claim 2, wherein for the predetermined frequency or direct current, an impedance of the first external current path is smaller than an impedance of the third external current path, and an impedance of the second external current path is smaller than an impedance of the fourth external current path.

4. The power supply semiconductor device of claim 3, wherein a sum of the impedance of the first external current path, the first internal impedance sum, and the impedance of the second external current path is equal to a sum of the impedance of the third external current path, the second internal impedance sum, and the impedance of the fourth external current path.

5. The power supply semiconductor device of claim 2, wherein the first internal impedance sum is made larger than the second internal impedance sum by making the on-resistance of the first transistor larger than the on-resistance of the third transistor, by making the on-resistance of the second transistor larger than the on-resistance of the fourth transistor, or by making the on-resistance of the first transistor larger than the on-resistance of the third transistor and making the on-resistance of the second transistor larger than the on-resistance of the fourth transistor.

6. The power supply semiconductor device of claim 2, wherein the first internal impedance sum is made larger than the second internal impedance sum by making the impedance of the first internal current path larger than the impedance of the fourth internal current path, by making the impedance of the third internal current path larger than the impedance of the sixth internal current path, or by making the impedance of the first internal current path larger than the impedance of the fourth internal current path and making the impedance of the third internal current path larger than the impedance of the sixth internal current path.

7. The power supply semiconductor device of claim 2, wherein an auxiliary capacitor different from the input capacitor is connected between the third external terminal and the fourth external terminal, and wherein the auxiliary capacitor is arranged closer to the set of the third external terminal and the fourth external terminal than the set of the first external terminal and the second external terminal.

8. A DC/DC converter, comprising:

the power supply semiconductor device of claim 1;

a rectifying/smoothing circuit connected to the switch terminal and configured to generate the output voltage by rectifying and smoothing the switching voltage at the switch terminal; and the input capacitor.

9. A DC/DC converter, comprising:

the power supply semiconductor device of claim 7;

a rectifying/smoothing circuit connected to the switch terminal and configured to generate the output voltage by rectifying and smoothing the switching voltage at the switch terminal;

the input capacitor; and the auxiliary capacitor.

* * * * *